United States Patent
Cai et al.

(10) Patent No.: US 12,008,903 B2
(45) Date of Patent: Jun. 11, 2024

(54) COLLISION WARNING METHOD, AND SYSTEM FOR PROTECTING VULNERABLE TRAFFIC PARTICIPANT, AND STORAGE MEDIUM

(71) Applicant: GUANGZHOU AUTOMOBILE GROUP CO., LTD., Guangzhou (CN)

(72) Inventors: Zhijun Cai, Guangzhou (CN); Bo Yang, Guangzhou (CN); Congchuan Chen, Guangzhou (CN); Xiaoping Li, Guangzhou (CN); Qigao Feng, Guangzhou (CN); Yanfang Zeng, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 61 days.

(21) Appl. No.: 18/081,551

(22) Filed: Dec. 14, 2022

(65) Prior Publication Data

US 2023/0114001 A1    Apr. 13, 2023

Related U.S. Application Data

(63) Continuation-in-part of application No. PCT/CN2022/098620, filed on Jun. 14, 2022.

(30) Foreign Application Priority Data

Sep. 10, 2021    (CN) .......................... 202111060743.4

(51) Int. Cl.
*G08G 1/16*    (2006.01)
*B60W 30/095*    (2012.01)
(Continued)

(52) U.S. Cl.
CPC ........... *G08G 1/16* (2013.01); *B60W 30/0956* (2013.01); *B60W 30/18009* (2013.01);
(Continued)

(58) Field of Classification Search
CPC .......... G08G 1/16; G08G 1/167; G08G 1/168; B60R 21/00; B60W 30/09; B60W 30/095;
(Continued)

(56) References Cited

U.S. PATENT DOCUMENTS

| | | | | |
|---|---|---|---|---|
| 5,699,040 A | * | 12/1997 | Matsuda | ............... G01S 13/931 340/904 |
| 8,538,674 B2 | * | 9/2013 | Breuer | .............. B60W 30/1884 340/436 |
| 11,260,854 B2 | * | 3/2022 | Jeon | ....................... B60K 28/06 |

FOREIGN PATENT DOCUMENTS

| CN | 104210489 | 12/2014 |
|---|---|---|
| CN | 105270366 | 1/2016 |

OTHER PUBLICATIONS

NPL Search (Mar. 20, 2024).*

* cited by examiner

*Primary Examiner* — Van T Trieu
(74) *Attorney, Agent, or Firm* — ScienBiziP, P.C.

(57) ABSTRACT

A collision warning method in relation to vulnerable road users (VRUs), applied in a host vehicle when being driven, obtains a relative lateral distance between a vehicle and a VRU and obtains speed of movement of the VRU in addition to speed and direction of the host vehicle. A warning scenario is determined according to the relative lateral distance and the VRU speed. A warning distance according to the warning scenario and the relative speed is calculated, a relative distance between the host vehicle and the VRU is obtained, and the issue of a corresponding level of a collision warning is determined according to a comparison between the warning distance and the relative distance.

20 Claims, 7 Drawing Sheets

(51) Int. Cl.
*B60W 30/18* (2012.01)
*B60W 40/105* (2012.01)
*B60W 50/14* (2020.01)

(52) U.S. Cl.
CPC .......... *B60W 40/105* (2013.01); *B60W 50/14* (2013.01); *B60W 2510/10* (2013.01); *B60W 2540/18* (2013.01); *B60W 2554/4029* (2020.02); *B60W 2554/4041* (2020.02); *B60W 2554/801* (2020.02); *B60W 2556/45* (2020.02)

(58) Field of Classification Search
CPC ............. B60W 30/0956; B60W 30/18; B60W 30/188; B60W 40/04; B60W 40/105; B60W 50/14
See application file for complete search history.

COLLISION WARNING METHOD, AND SYSTEM FOR PROTECTING VULNERABLE TRAFFIC PARTICIPANT, AND STORAGE MEDIUM

The present disclosure claims a priority of a Chinese patent application, which is filed in China National Intellectual Property Administration (CNIPA) on Sep. 10, 2021, entitled "Collision warning method, and system for protecting vulnerable traffic participant, and storage medium", and assigned a serial numbered 202111060743.4. All contents of Chinese patent application are hereby incorporated by reference in the present application.

FIELD

The subject matter herein generally relates to a field of safe driving, in particular, relates to a collision warning method, and a collision warning system for protecting vulnerable traffic participant, and a computer readable storage medium.

BACKGROUND

With increased amount of vehicles, and a development of intelligent driving technology, and a popularization of 5G communication technology, the requirements for in-vehicle V2X applications are increasing greatly, and V2X international standards and V2X national standards have been introduced one after another, and the application scenarios of V2X-related functions have become more and more important. A collision warning of vulnerable traffic participants, as one of the most practical V2X scenarios stipulated by the national standard, aims to enable vehicle drivers to detect vulnerable road-users at risk of collision in time when the driver's line of sight is blocked by large vehicles or obstacles, so as to remind the driver to adjust and avoid risks as soon as possible and reduce occurrences of traffic accidents, which is especially effective in places with narrow road vision. The vulnerable road-users are mainly referring to pedestrians, non-motor vehicles, battery cars, etc.

At present, the pedestrian collision warning uses V2X as the basis. The host vehicle receives the PSM/RSM national standard message sent by the surrounding vulnerable traffic participants or RSU to obtain information as to real-time information of vulnerable traffic participants on the road, and calculates the collision risk with the surrounding vulnerable traffic participants based on the real-time information. The equipment with V2X communication function carried by the participants sends a V2X message with pedestrian information, and the RSU also uses cameras and other equipment to obtain the information of surrounding vulnerable traffic participants and broadcasts the corresponding V2X message by the V2X communication function. Since the V2X national standard only defines a scenario overview, there is currently no unified algorithm and standard for specific implementations of the scenario, and the warning reporting mechanism and scenario coverage are also different in the V2X national standard. Specifically, the current mainstream algorithms do not calculate a warning level, and lack the means of determining the relative positions between the vulnerable traffic participants and the participant screening algorithm. A scenario where a vehicle is reversing and a scenario of a vehicle at a low-speed colliding with pedestrian collision are rarely covered. Furthermore, there is no additional determination in the mainstream algorithms for pedestrians who are moving faster, such as hurrying or running, than pedestrians who are at normal walking speeds, and the vehicle has already slowed down. Therefore, the current V2X-based pedestrian collision warning needs to be further improved to facilitate drivers to better identify risk sources and threat levels and to avoid the risks.

BRIEF DESCRIPTION OF THE DRAWINGS

Implementations of the present disclosure will now be described, by way of embodiment, with reference to the attached figures.

DETAILED DESCRIPTION

Figure 1:
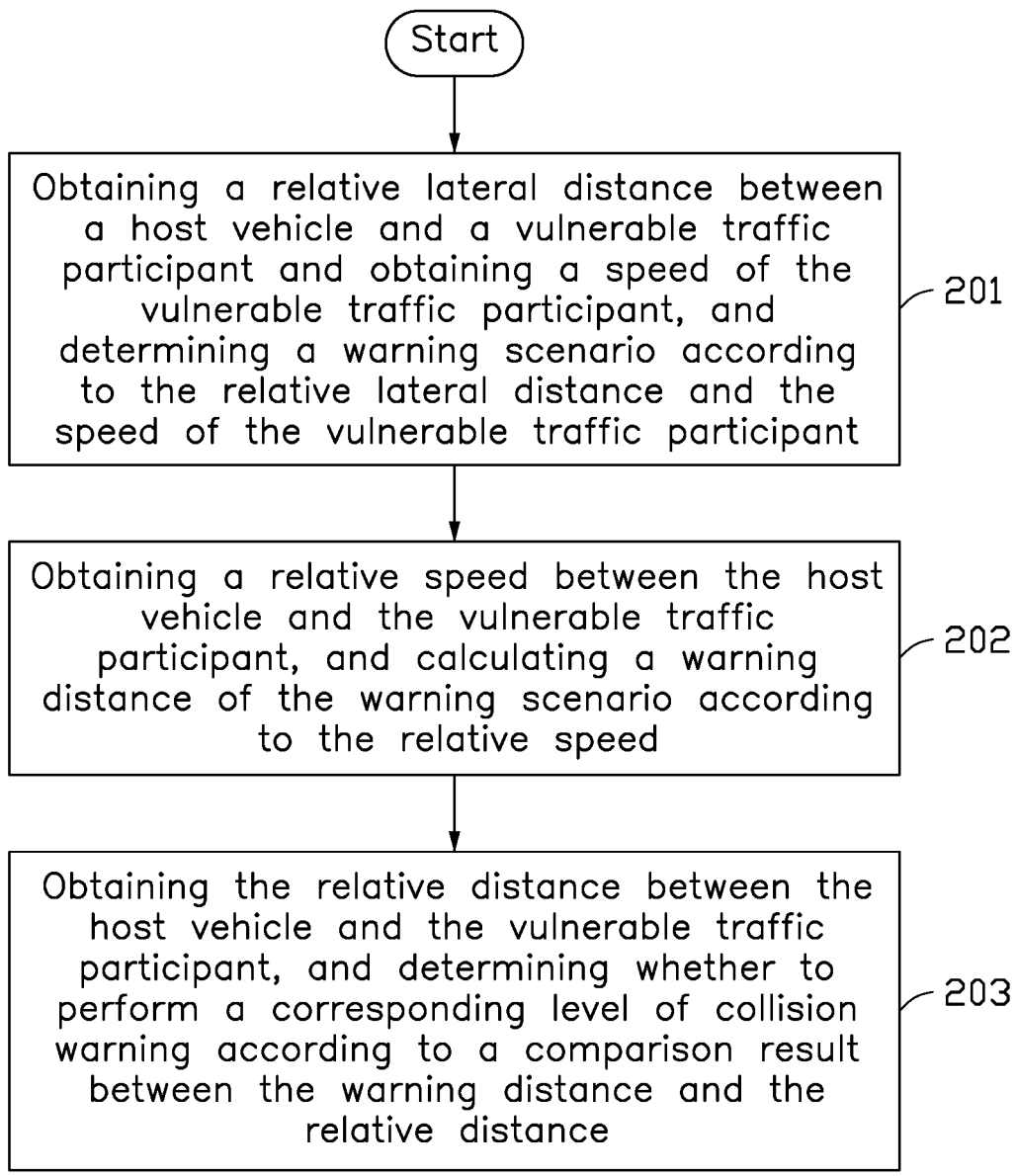
FIG. 1 is a flowchart of one embodiment of a collision warning method for protecting vulnerable traffic participant.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

The present discloses provides a collision warning method for protecting vulnerable traffic participant.

In one embodiment, the method is implemented based on a V2X system. It is well known that the V2X system enables communication between vehicles, between the vehicles and base stations, and between the base stations, thereby obtaining a series of traffic information such as real-time road conditions, road information, and traffic participant information. FIG. 1 illustrates a flowchart of the method. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, obtaining a relative lateral distance between a host vehicle and a vulnerable traffic participant and obtaining a speed of the vulnerable traffic participant, and determining a warning scenario according to the relative lateral distance and the speed of the vulnerable traffic participant.

Figure 2:
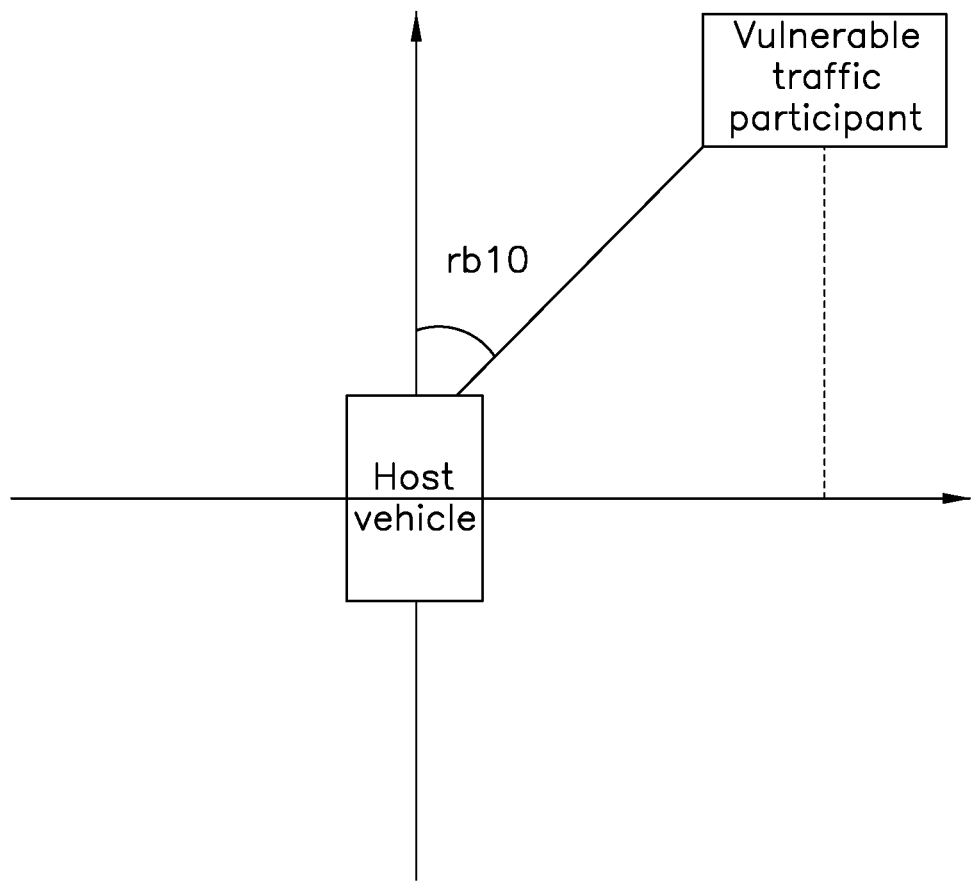
FIG. 2 is a schematic diagram of one embodiment of determining relative positions between the vulnerable traffic participants and vehicles.

In one embodiment, the relative lateral distance between the host vehicle and the vulnerable traffic participant and the speed of the vulnerable traffic participant can be obtained based on the V2X system. The speed and a position of the vulnerable traffic participant can be directly obtained by the V2X system. Referring to FIG. 2, the relative lateral distance between the host vehicle and the vulnerable traffic participant is determined based on a coordinate system. The coordinate system is established as follow: a center point of the host vehicle is taken as an origin of a coordinate system, a heading angle of the host vehicle is taken as a positive half-axis of a y-axis of the coordinate system, and a direction perpendicular to the right side of the y-axis is a positive half-axis of a x-axis of the coordinate system. The x-coordinate of the vulnerable traffic participant in the coordinate system is calculated as the relative lateral distance.

At block 202, obtaining a relative speed between the host vehicle and the vulnerable traffic participant, and calculating a warning distance of the warning scenario according to the relative speed.

In one embodiment, when the warning scenarios are different, the warning distances corresponding to different warning scenarios are also different.

At block 203, obtaining the relative distance between the host vehicle and the vulnerable traffic participant, and determining whether to perform a corresponding level of collision warning according to a comparison result between the warning distance and the relative distance.

In one embodiment, the speed of the host vehicle is obtained, and the relative speed of the host vehicle relative to the vulnerable traffic participant can be calculated according to the speed of the vulnerable traffic participant and the speed of the host vehicle. In one embodiment, the warning distance can be understood as a distance traveled by the host vehicle relative to the vulnerable traffic participant from the moment of focus until the host vehicle stops driving in the warning scenario.

The relative speed mentioned in the embodiment of the present disclosure refers to the speed of the host vehicle obtained by comparing the speed of the host vehicle and the vulnerable traffic participant, assuming that the vulnerable traffic participant is not moving, for example, if the vulnerable traffic participant and the host vehicle move in the same direction, that is, a movement direction of the vulnerable traffic participant and a movement direction of the host vehicle are the same, the speed of the host vehicle is 40 km/h, and the speed of the vulnerable traffic participant is 5 km/h, then the relative speed of the host vehicle relative to the vulnerable traffic participant is 40 km/h. minus 5=35 km/h.

For example, in any warning scenario, when the relative distance between the host vehicle and vulnerable traffic participants is less than or equal to the warning distance, it means that a collision will occur and a warning needs to be issued, and the warning level is determined according to the warning distance. When the relative distance between the host vehicle and vulnerable traffic participant is greater than the warning distance, it means that a collision is not foreseen and no warning is required.

It should be noted that, in one embodiment, there is no specific limitation on the form of an actuator that issues warning.

The method of the embodiment of the present disclosure executes different warning strategies based on different warning scenarios, calculates the warning distance corresponding to the warning scenario according to the relative speed of the host vehicle, and calculates the warning distance corresponding to the warning scenario according to the relative speed of the host vehicle to the vulnerable traffic participant. According to the comparison result of the warning distance and the relative distance between the host vehicle and the vulnerable traffic participant, it is determined whether or not to carry out the collision warning of the corresponding level. It is proposed to provide different warning strategies based on different warning scenarios, which can help drivers better identify risk sources and threat levels and avoid them.

Figure 3:
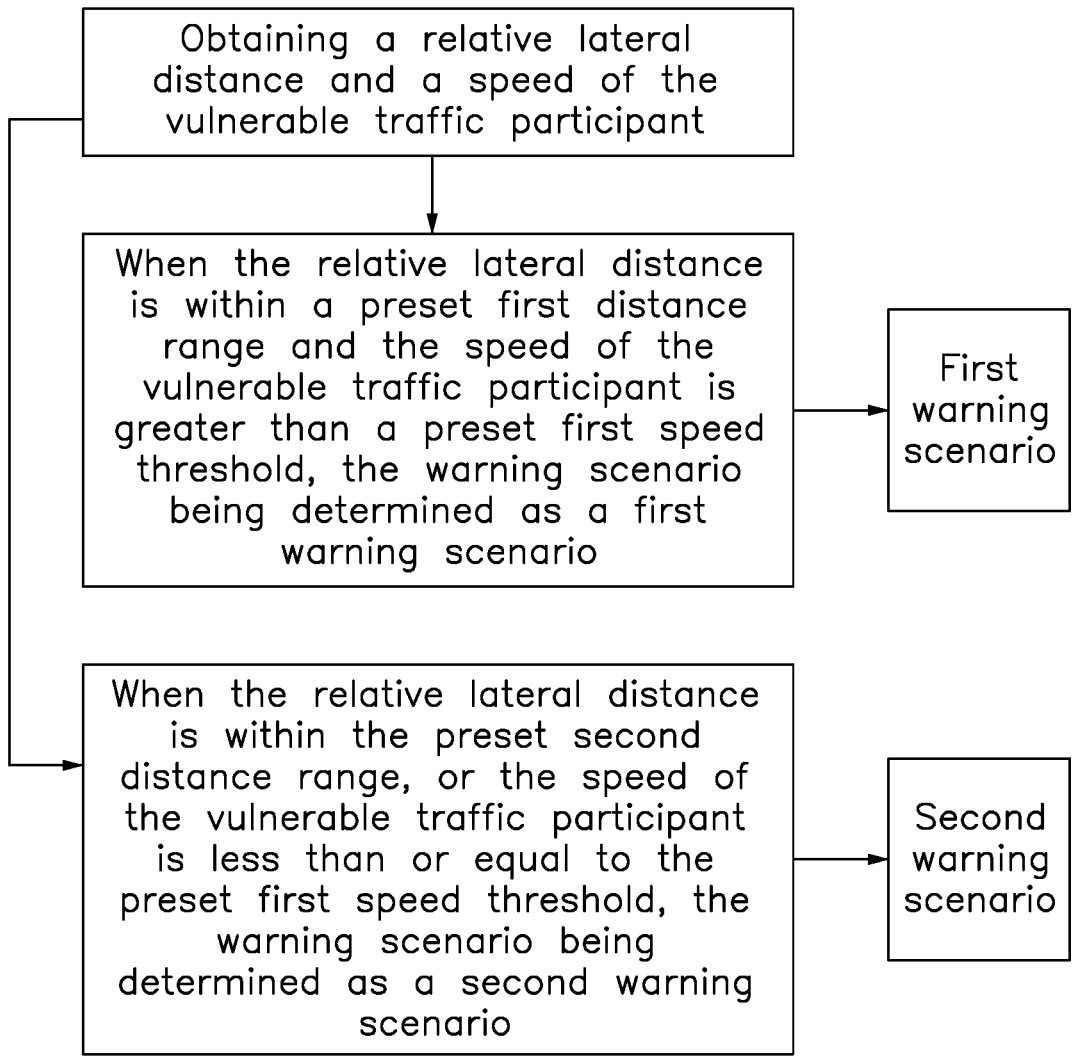
FIG. 3 is a flowchart of one embodiment of determination of a warning scenario.

In one embodiment, referring to FIG. 3, block 201 further includes: when the relative lateral distance is within a preset first distance range and the speed of the vulnerable traffic participant is greater than a preset first speed threshold, the warning scenario is determined as the first warning scenario, and the first warning scenario is determined and executed; when the relative lateral distance is within the preset second distance range, or the speed of the vulnerable traffic participant is less than or equal to the preset first speed threshold, the warning scenario is determined as the second warning scenario, and the second warning scenario is determined and executed.

In one embodiment, the first speed threshold is preferably, but not limited to, 5 km/h.

Figure 4:
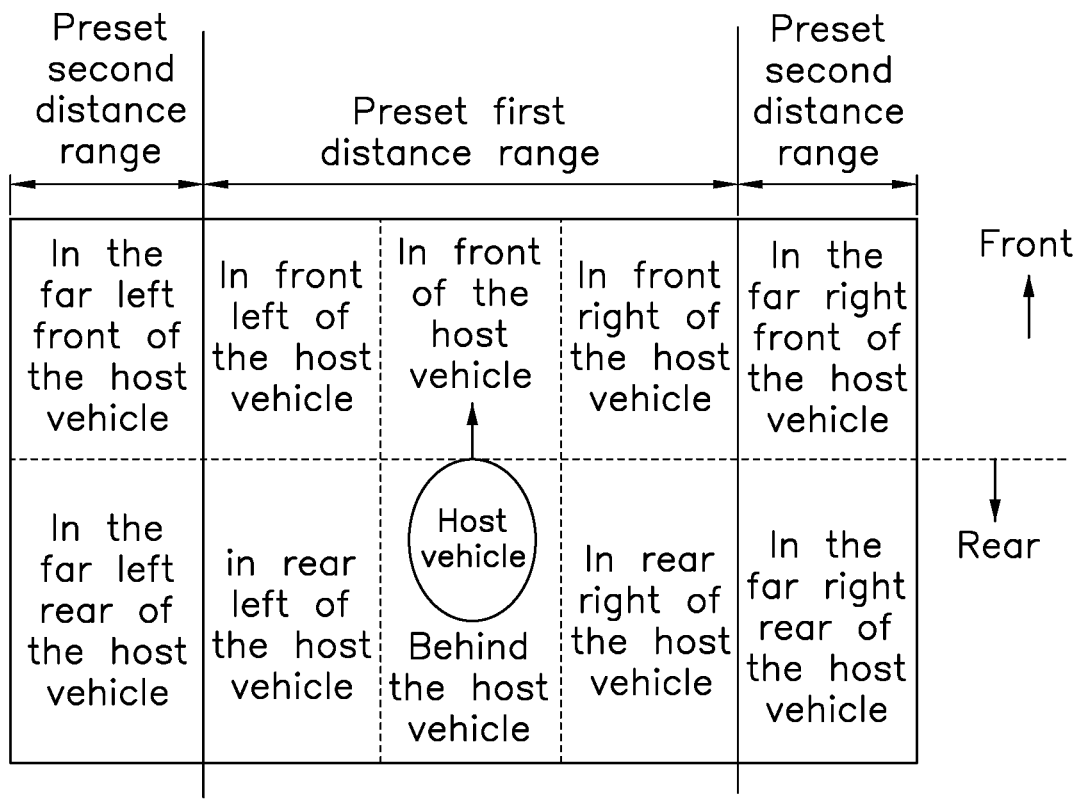
FIG. 4 is a schematic diagram of one embodiment of determining a distance range between the vulnerable traffic participants and a host vehicle.

In one embodiment, when the relative lateral distance is within the preset first distance range, the vulnerable traffic participants are located directly in front of the host vehicle, in front left or right of the host vehicle, behind the host vehicle, or in rear left or right of the host vehicle, as shown in FIG. 4.

When the relative lateral distance is within the preset second distance range, the vulnerable traffic participant is located in the far left front of the host vehicle, the far right front of the host vehicle, the far left rear of the host vehicle, and the far right rear of the host vehicle as shown in FIG. 4.

In one embodiment, the first distance range and the second distance range are preset according to a body width of the host vehicle. Referring to FIG. 2, it is assumed that $W1/2$ indicates a half of the body width of the host vehicle, $W1$ indicates an area threshold for protecting vulnerable traffic participant in front/rear and left/right of the host vehicle, and $W2$ indicates the area threshold for protecting vulnerable traffic participant located in the far left/right front of the host vehicle. Taking the pedestrian as an example, in the coordinate system shown in FIG. 2, a dot product of a direction vector of a front of the host vehicle and a line vector between the pedestrian and the host vehicle is calculated, the direction of the line vector is from the host vehicle directly to the pedestrian. When a calculation result of the dot product is greater than or equal to 0, it is determined that the pedestrian is in front of the host vehicle and −90°≤rb10≤90° is determined, rb10 indicates a direction angle between the direction vector of the front of the host vehicle and the line vector. When the result of the dot product t is less than 0, it is determined that the pedestrian is behind the host vehicle, and rb10>90° or rb10<90°.

Combined with the above direction angles, 10 different regions are specified as follows, these being (1.1)~(1.10):
(1.1) when −2W2≤x10<−W2−W1/2, and −90°≤rb10≤90°, the vulnerable traffic participant is located on the left and in far front of the host vehicle;
(1.2) when −W2−W1/2≤x10<−W1−W1/2, and −90°≤rb10≤90°, the vulnerable traffic participant is located on the front left of the host vehicle;
(1.3) when −W1−W1/2≤x10<W1+W1/2, and −90°≤rb10≤90°, the vulnerable traffic participant is directly in front of the host vehicle;
(1.4) when W1+W1/2≤x10<W2+W1/2, and −90°≤rb10≤90°, the vulnerable traffic participant is located on the front right of the host vehicle;
(1.5) when W2+W1/2≤x10≤2W2+W1/2, and −90°≤rb10≤90°, the vulnerable traffic participant is located in far and right front of the host vehicle;
(1.6) when −2W2≤x10<−W2−W1/2, and rb10>90° or rb10<90°, the vulnerable traffic participant is located in the far left and rear of the host vehicle;
(1.7) when −W2−W1/2≤x10<−W1−W1/2, and rb10>90° or rb10<90°, the vulnerable traffic participant is located at the left rear of the host vehicle;
(1.8) when −W1−W1/2≤x10<W1+W1/2, and rb10>90° or rb10<90°, the vulnerable traffic participant is located behind the host vehicle;
(1.9) when W1+W1/2≤x10<W2+W1/2, and rb10>90° or rb10<90°, the vulnerable traffic participant is located at the right rear of the host vehicle;
(1.10) when W2+W1/2≤x10≤2W2+W1/2, and rb10>90° or rb10<90°, the vulnerable traffic participant is located at the far right rear of the host vehicle.

Figure 5:
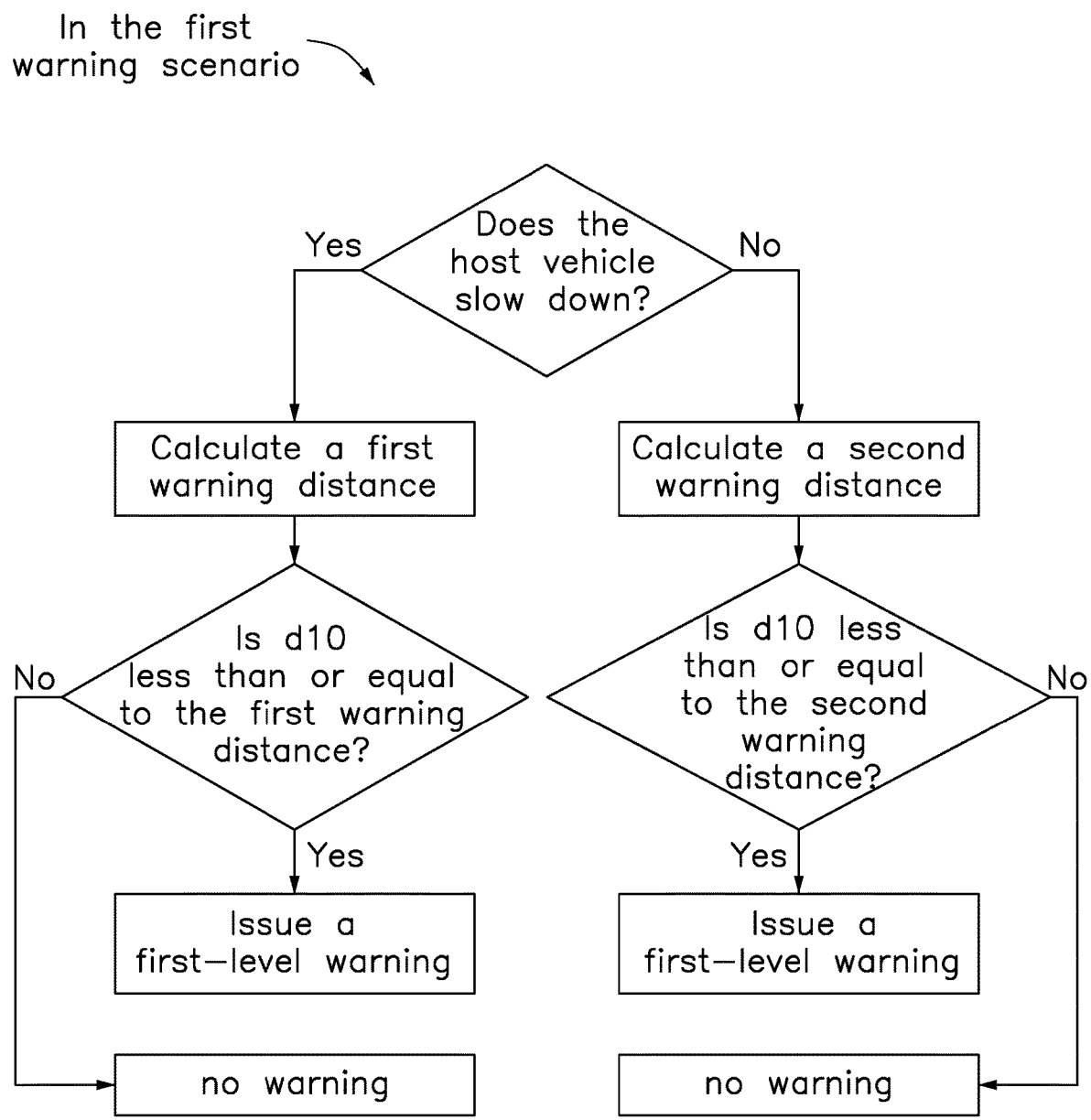
FIG. 5 is a flowchart of one embodiment of determination of a warning in a first warning scenario.

In one embodiment, referring to FIG. 5, block 202 further includes:
in the first warning scenario, calculating the first warning distance when the host vehicle is in a decelerating state. In one embodiment, the first warning distance is a sum between a distance that the host vehicle travels from time when the host vehicle starts to brake to the time of the host vehicle stopping and a preset safety distance in the first warning scenario.

In one embodiment, the first warning distance d_slowed1 is calculated according to formula d_slowed1=(v_rel*v_rel)/(2*φ*g)+d0, wherein v_rel is the relative speed of the host vehicle relative to the vulnerable traffic participant, the unit of v_re being m/s; φ is a pavement adhesion coefficient, which is 0.75 in one embodiment, and φ is a configurable calibration parameter; g is gravitational acceleration, a default value of g is 9.80665 m/s$^2$; d0 is the preset safety distance, which is a distance from the host vehicle to the pedestrian when the host vehicle stops, which is a configurable calibration parameter, the unit of v_re being meters.

In one embodiment, referring to FIG. 5, block 203 further includes:
in the first warning scenario, performing a first-level warning when the relative distance is less than or equal to the first warning distance. No warning is issued when the relative distance is greater than the first warning distance.

In one embodiment, the first-level warning is the lowest-level warning; (v_rel*v_rel)/(2*φ*g) of the above formula represents the distance traveled by the host vehicle after starting to brake until stopped; for example, (v_rel*v_rel)/(2*φ*g)+d0≤r10 means that the relative distance between the host vehicle and the vulnerable traffic participant is still less than or equal to the safe distance d0 when the host vehicle is stopped after braking. The r10 is the distance between the host vehicle and the vulnerable traffic participant. This means that the relative distance between the host vehicle and the vulnerable traffic participant is less than the safety distance d0 after the host vehicle brakes until the host vehicle is stopped.

In one embodiment, referring to FIG. 5, block 202 further includes:
in the first warning scenario, calculating the second warning distance when the host vehicle is in a non-decelerating state. In one embodiment, the second warning distance is a sum between a product of the driving distance of the host vehicle from time when the driver has a reaction to time when a braking of the host vehicle takes effect in the first warning scenario and the preset warning distance calculation coefficient, and the first warning distance.

In one embodiment, the second warning distance d_warning1 is calculated according to formula d_warning1=v_rel*(Tr+Ts)*Rsofttohard+d_slowed1, in which Tr is a host vehicle braking coordination time, which is preferably but not limited to 0.3 seconds in this embodiment, and Tr is a configurable calibration parameter; Ts is the driver's reaction time, which is preferably but not limited to 1.2 s in this embodiment, and Ts is a configurable calibration parameter; Rsofttohard is a warning distance calculation coefficient, preferably but not limited to 1.5 in this embodiment, which is a configurable calibration parameter.

In one embodiment, referring to FIG. 5, block 203 further includes:
in the first warning scenario, issuing a first-level warning when the relative distance is less than or equal to the second warning distance, otherwise no warning is given.

In one embodiment, the v_rel*(Tr+Ts) of the above formula indicates the distance traveled by the driver from the time when the driver has a brake reaction to time when a braking of the host vehicle takes effect. When the second warning distance is greater than r10, it means that there may be a risk of collision at this time, and that the relative distance between the host vehicle and the vulnerable traffic participant when the host vehicle stops is less than the safety distance d0, and the first-level warning is issued.

In one embodiment, when detecting that the host vehicle decelerates, it means that the driver has realized the possible danger, a risk of pedestrian collision is low, and as the deceleration has already started, the driver's reaction time Ts and the braking effective time Tr do not need to be considered in the calculation. At this time, to reduce the warning distance requirement, it is only necessary to determine whether to issue a warning according to the comparison result between the first warning distance and the relative distance, so as to reduce the probability of false warning and continue to monitor the status of the host vehicle and vulnerable traffic participant. From another point of view, when the driver's reaction time Ts and the braking effective time Tr are not considered, that is, it is assumed that the driver's reaction time Ts and the braking effective time Tr are both 0, then the second warning distance is equal to the first warning distance. Therefore, only the first warning distance needs to be calculated at this time.

Figure 6:
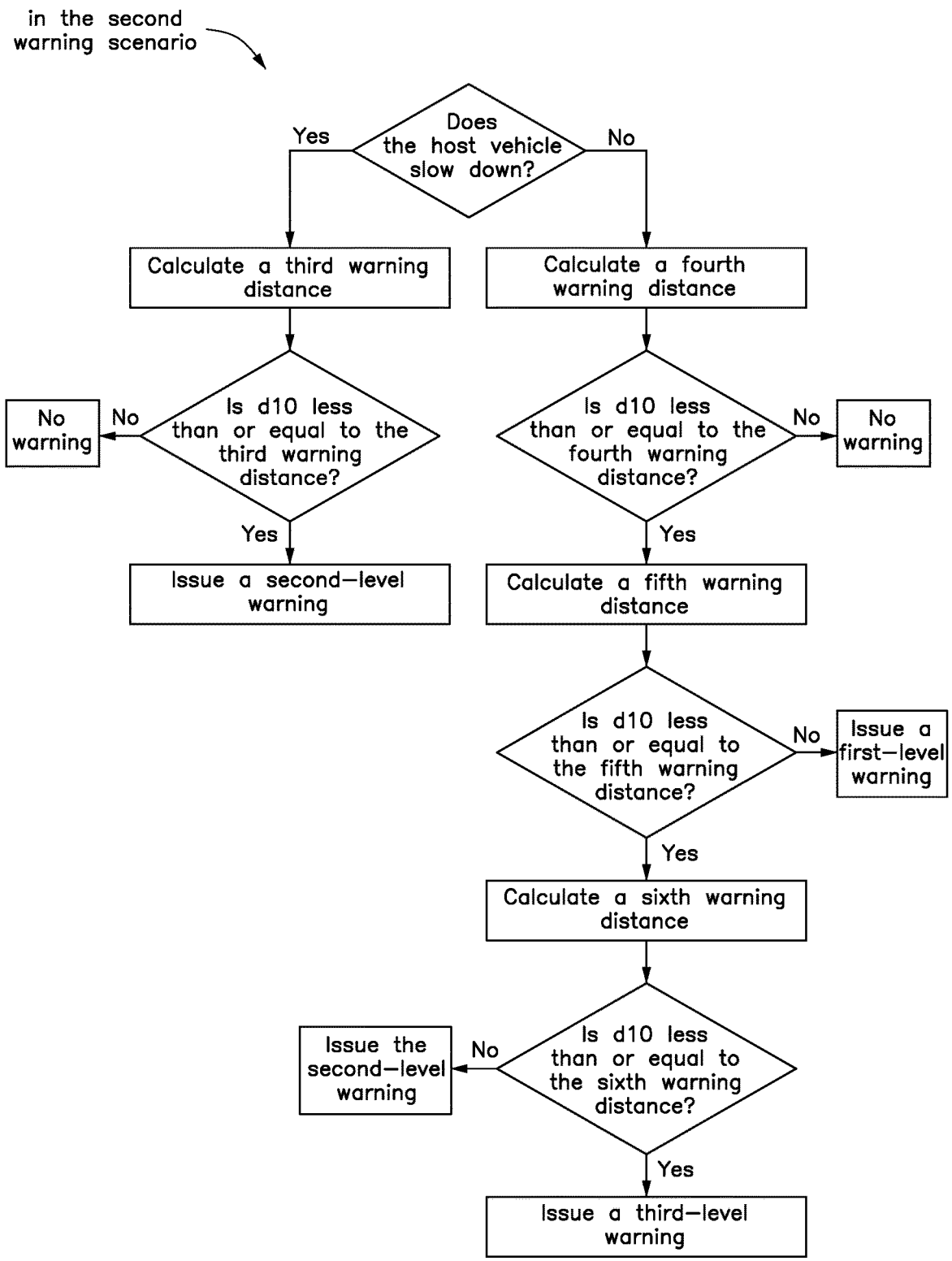
FIG. 6 is a flowchart of one embodiment of determination of a warning in a second warning scenario.

In one embodiment, referring to FIG. 6, block 202 further includes:

In the second warning scenario, calculating the third warning distance when the host vehicle is in a decelerating state. In one embodiment, the third warning distance is a sum between a distance that the host vehicle travels from time when the host vehicle starts to brake to the point in time when the host vehicle is stopped and the preset safety distance in the second warning scenario.

In one embodiment, the third warning distance d_slowed2 is calculated according to a formula d_slowed2= $(v\_rel*v\_rel)/(2*\varphi*g)+d0$, in which v_rel is the relative speed of the host vehicle relative to the vulnerable traffic participant, the unit of v_re is m/s; $\varphi$ is the pavement adhesion coefficient, which is 0.75 in one embodiment, and $\varphi$ is a configurable calibration parameter; g is gravitational acceleration, a default value of g is 9.80665 m/s$^2$; d0 is the preset safety distance, which is a safe distance between the host vehicle and the pedestrian when the host vehicle is stopped, and d0 is a configurable calibration parameter; the unit of v_re is meters.

In one embodiment, referring to FIG. 6, block 203 further includes:

in the second warning scenario, issuing a second-level warning when the relative distance is less than or equal to the third warning distance. No warning is issued when the relative distance is greater than the third warning distance.

In one embodiment, the second-level warning is a higher-level warning than the first-level warning; $(v\_rel*v\_rel)/(2*\varphi*g)$ of the above formula represents the distance traveled by the host vehicle after starting to brake until the host vehicle stops; for example, $(v\_rel*v\_rel)/(2*\varphi*g)+d0<r10$ means that the relative distance between the host vehicle and the vulnerable traffic participant is still less than or equal to the safe distance d0 when the host vehicle is stopped after braking. The r10 is the relative distance between the host vehicle and the vulnerable traffic participant. Namely, it means that the relative distance between the host vehicle and the vulnerable traffic participant is less than the safety distance d0 after the host vehicle braking is applied until the host vehicle stops.

In one embodiment, referring to FIG. 6, block 202 further includes:

in the second warning scenario, calculating the fourth warning distance when the host vehicle is in a non-decelerating state. In one embodiment, the fourth warning distance is a sum of a product of the driving distance of the host vehicle traveled from time when the driver has a brake reaction to time when the host vehicle stops in the second warning scenario and the preset warning distance calculation coefficient, and the third warning distance.

In one embodiment, the fourth warning distance d_warning2 is calculated according to formula d_warning 2=v_rel* (Tr+Ts)*Rsofttohard+d_slowed2, in which Tr is a host vehicle braking coordination time, which is preferably but not limited to 0.3 seconds in this embodiment, and Tr is a configurable calibration parameter; Ts is the driver's reaction time, which s preferably but not limited to 1.2 s in this embodiment, and Ts is a configurable calibration parameter; Rsofttohard is a warning distance calculation coefficient, preferably but not limited to 1.5 in this embodiment, which is a configurable calibration parameter.

In one embodiment, referring to FIG. 6, block 203 further includes:

in the second warning scenario, when the relative distance is greater than the fourth warning distance, no pre-warning is issued; when the relative distance is less than or equal to the fourth pre-warning distance, the fifth pre-warning distance is calculated; when the distance is greater than the fifth warning distance, the first-level warning will be issued. In one embodiment, the fifth warning distance is a sum of a driving distance of the host vehicle traveled from starting point in time of the driver reaction time to time when the host vehicle is stopped after braking, and the third warning distance.

In one embodiment, the fifth warning distance d_major is calculated according to formula d_major=v_rel*(Tr+Ts)+ d_slowed2.

In one embodiment, referring to FIG. 6, block 202 further includes:

in the second warning scenario, when the relative distance is less than or equal to the fifth warning distance, calculating the sixth warning distance. In one embodiment, the sixth warning distance is a sum between a driving distance of the host vehicle traveled from time when the driver has a brake reaction to time when the host vehicle is braked, and the third warning distance.

In one embodiment, the sixth warning distance d_emergency is calculated according to formula 2d_emergency= v_rel*Ts+d_slowed.

In one embodiment, referring to FIG. 6, block 203 further includes:

when the relative distance is greater than the sixth warning distance, issuing the second-level warning; when the relative distance is less than or equal to the sixth early-warning distance, issuing the third-level warning.

In one embodiment, when detecting that the host vehicle decelerates, it means that the driver has realized the possible danger, a risk of pedestrian collision is low, and as the deceleration has already started, the driver's reaction time Ts and the braking effective time Tr do not need to be considered in the calculation. At this time, to reduce the warning distance requirement, it is necessary to determine whether to issue a warning according to the comparison result between the first warning distance and the relative distance, so as to reduce the probability of false warning and continue to monitor the status of the host vehicle and vulnerable traffic participant. From another point of view, when the driver's reaction time Ts and the braking effective time Tr are not considered, that is, it is assumed that the driver's reaction time Ts and the braking effective time Tr are both 0, then the fourth, fifth and sixth warning distances are all equal to the third warning distance. Therefore, only the third warning distance needs to be calculated at this time.

In one embodiment, the three warning distances, such as the fourth warning distance, the fifth warning distance, and the sixth warning distance, respectively represent the threshold limits of the three warning levels, the corresponding degrees of danger increase in turn, and the calculated theoretical values of the fourth, fifth, and sixth warning distances decrease sequentially.

By determining a relationship between the three warning distances and the relative distances r10, a degree of urgency of the possibility of collision between the host vehicle and the vulnerable traffic participant is obtained, and the corresponding warning level is reported. If the three warning distances are smaller than the relative distance r10, there is very low possibility of collision.

It should be noted that the parameters such as the relative speed and the relative distance use the parameters of the host vehicle and vulnerable traffic participant, so the relative speed and the relative distance are fixed values in each calculation cycle.

It should also be noted that the third-level warning is the most urgent state; the second-level warning is less urgent, and the driver can avoid it by normal operation, that is, the normal reaction time plus the braking time. The first-level warning corresponds to relatively loose early-warning scenarios, which can be avoided when the driver's reaction is slow or the driver's braking is slow to take effect. The first-level warning, the second-level warning, and the third-level warning use different warning methods.

It can be understood that the three-level warning in the embodiment of the present disclosure is only an example solution. Based on the concept of the embodiment of the present disclosure, those skilled in the art are familiar with adding more levels of warning, for example, a fourth-level warning, a fifth-level warning, etc., are all simple adjustments that can be easily made by those skilled in the art based on the content of the embodiments of the present disclosure, and are all within the protection scope of the embodiments of the present disclosure.

In one embodiment, before determining the warning scenario according to the relative lateral distance and the speed of the vulnerable traffic participant, the method further includes block 100.

At block 100, periodically determining whether there is a collision risk between the host vehicle and the vulnerable traffic participant. When there is a collision risk, blocks 201-203 are executed, if is no collision risk is foreseen, blocks 201-203 are not executed.

In one embodiment, block 100 further includes block 101.

At block 101, obtaining the direction angle of a position of the vulnerable traffic participant relative to the heading angle of the host vehicle, and determining a position classification of the vulnerable traffic participant according to a comparison result between the direction angle and a preset angle range, wherein the position classification includes a first classification indicating that the vulnerable traffic participant is located in front of the host vehicle and a second classification indicating that the vulnerable traffic participant is located at the rear of the host vehicle; obtaining a current transmission gear of the host vehicle, and determining whether the host vehicle is driving forward or reversing according to the current gear of the host vehicle; determining whether the vulnerable traffic participant has a collision risk according to the current gear of the host vehicle and the position classification.

In one embodiment, when the host vehicle is driving forward, and the position of the vulnerable traffic participant is classified as being behind the host vehicle, it is determined that there is no risk of collision; when the host vehicle is reversing, and the position of the vulnerable traffic participant is classified as being in front of the host vehicle, it is determined that there is no risk of collision.

Specifically, in general, the speed of the host vehicle is faster than that of the vulnerable traffic participant. If the vulnerable traffic participant is behind the host vehicle (i.e. rb10>90° or rb10<90° and the host vehicle is driving forward, it is determined that the host vehicle is driving away from the vulnerable traffic participant and there is no risk of collision. If the vulnerable traffic participant is in front of the host vehicle (i.e. −90°≤rb10≤90° and the host vehicle is reversing, it is determined that the host vehicle is driving away from the vulnerable traffic participant and there is no risk of collision. In the embodiment, the two types of situations are filtered to improve the calculation efficiency of collision risk assessment and avoid warnings issued excessively.

In one embodiment, block 100 further includes block 102.

At block 102, obtaining a current speed of the host vehicle, when the current speed of the host vehicle is less than a preset second speed threshold, then obtaining a last recorded heading angle of the host vehicle and a current wheel angle of the host vehicle, and adding the last recorded heading angle of the host vehicle to the current wheel angle of the host vehicle to obtain the current heading angle of host vehicle.

Specifically, a mainstream on-board positioning chip is not able to output a real-time heading angle when the speed of the host vehicle is low. In order to overcome above technical problem, the method in the embodiment can be implemented during a low-speed driving. In one embodiment, when the current speed of the host vehicle is less than a first speed threshold, for example, the first speed threshold is 5 km/h, and the current heading angle heading of the host vehicle is calculated based on a last recorded heading heading_0 of the host vehicle and the current wheel angle of the host vehicle driving in a low speed state, so that the method of the embodiment can output the real-time heading angle when the speed of the host vehicle is low. The current heading angle heading of the host vehicle is calculated according to formula heading=heading_0+St_angle/St, wherein St_angle is the current wheel angle of the host vehicle, and St is a steering wheel steering ratio of the host vehicle, such parameter values need to be pre-calibrated according to a host vehicle model, and a default value of the steering wheel steering ratio is preferably 15:1.

The heading angle calculated this time is used as heading_0 for a next calculation of the heading angle. In a low-speed scenario, a periodic calculation of the heading angle needs to be made. A general frequency of the periodic calculation is 10 Hz. An update frequency of the heading angle of the host vehicle by positioning at a normal speed of the host vehicle is generally 10 Hz.

In one embodiment, block 100 further includes block 103.

At block 103, obtaining the relative distance between the host vehicle and the vulnerable traffic participant, and comparing the relative distance with a preset distance threshold; determining that there is no risk of collision when the relative distance is greater than the preset distance threshold.

Specifically, the preset distance threshold is a maximum range value of a VRU warning of the host vehicle. In one embodiment, the preset distance threshold is preferably but not limited to 200 meters. When the relative distance is greater than the preset distance threshold, it indicates that the distance between the pedestrian and the host vehicle is within the maximum range of the VRU warning, and that there is no risk of collision. In one embodiment, such cases are filtered to improve the calculation efficiency of collision risk assessment and avoid excessive warnings.

In one embodiment, block 100 further includes block 104.

At block 104, obtaining the current speed of the host vehicle, and comparing the current speed of the host vehicle with the preset second speed threshold, determining that there is no risk of collision when the current speed of the host vehicle is less than or equal to the second speed threshold.

Specifically, the second speed threshold is a minimum threshold of the speed of the host vehicle, a unit of the second speed threshold is m/s, and a configurable calibration parameter defaults to 1 m/s. When the speed of the host vehicle is less than the second speed threshold, it is determined that there is no risk of collision. In one embodiment, such cases are filtered to improve the calculation efficiency of collision risk assessment and avoid excessive warnings.

In one embodiment, block 100 further includes block 105.

At block 105, obtaining the relative lateral distance between the position of the vulnerable traffic participant and the host vehicle; when the relative lateral distance is within the preset second distance range (that is, the vulnerable traffic participant is located in the far left front, far right front, far left rear, or far right rear of the host vehicle), and the speed of the vulnerable traffic participant is less than or equal to the preset first speed threshold, determining that the vulnerable traffic participant is far away from the host vehicle and the speed of the vulnerable traffic participant is slow, and that there is no risk of collision.

It should be noted that the above blocks S101 to S105 may be performed simultaneously or sequentially, or only one or more of the blocks may be performed, and for any vulnerable traffic participant, if it is determined by any one of the above blocks S101 to S105 that there is no risk of collision between the vulnerable traffic participant and the host vehicle, the method of this embodiment excludes and filters out any vulnerable traffic participant, and does not execute the warning calculations of steps S201~S203.

It can be seen from the description of the above embodiments, the method of the embodiment of the present disclosure has the following advantages: the collision warning method of the embodiment of the present disclosure defines a position of the vulnerable traffic participant relative to the host vehicle and a method or recognition (a classification of the vulnerable traffic participant relative to the host vehicle); the method of the embodiment of the present disclosure generate different warnings according to the vulnerable traffic participants in different directions when reporting the vulnerable traffic participant warning to the host vehicle, helping the driver to identify the position of the vulnerable traffic participant with collision risk, so as to avoid the risk of collision; the disclosure also designs a screening method for protecting vulnerable traffic participant, and filters the vulnerable traffic participants without collision risk, so as to improve the calculation efficiency and avoid excessive warnings; the method of the embodiment of the present disclosure also provides a calculation of the warning level. For the vulnerable traffic participants moving faster than the normal walking speed and whose distance is within a certain range from the host vehicle, multiple warning level calculations are added, which increases a reliability of risk identification and facilitates the driver's understanding and judgment. In addition, the method of the embodiment of the present disclosure also adds the calculation of the collision warning for protecting vulnerable traffic participant when the host vehicle is reversing, and solves a problem of the inaccurate heading angle when the host vehicle is running at low speed, so that the method of the embodiment of the present disclosure can cover reversing and collision warning scenarios for protecting vulnerable traffic participant at low speed.

Figure 7:
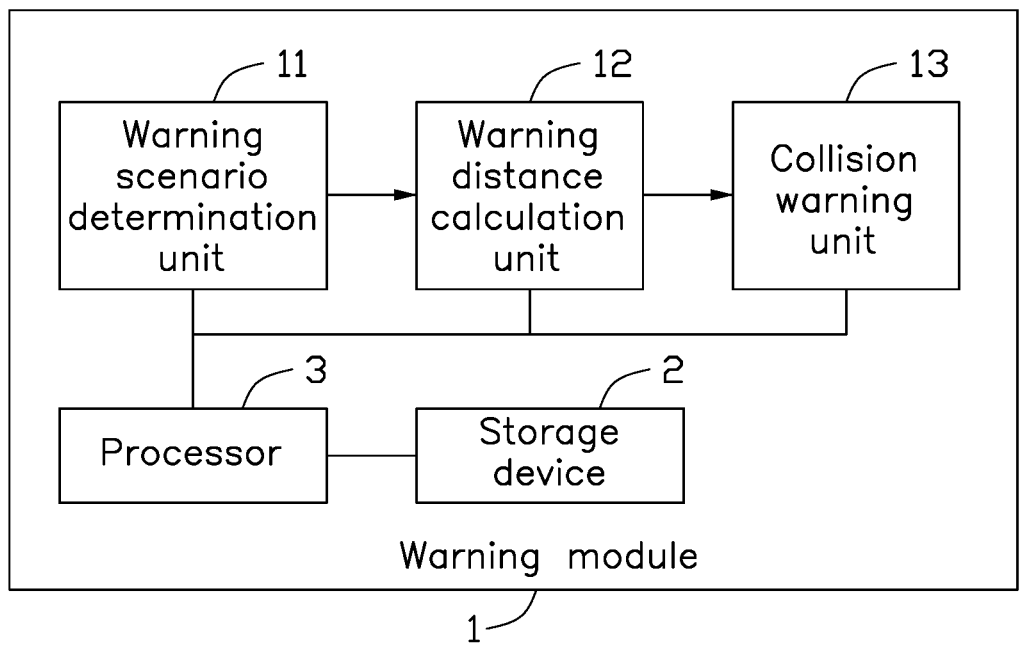
FIG. 7 is a frame diagram of one embodiment of a collision warning system for protecting vulnerable traffic participant.

FIG. 7 illustrates a collision warning system for protecting vulnerable traffic participant. The collision warning system can realize the collision warning method for protecting vulnerable traffic participant described in the above embodiments. In one embodiment, the collision warning system includes a warning module 1. The warning module 1 includes a warning scenario determination unit 11, a warning distance calculation unit 12, and a collision warning unit 13.

The warning scenario determination unit 11 obtains a relative lateral distance between a host vehicle and a vulnerable traffic participant and obtains a speed of the vulnerable traffic participant, and determines a warning scenario according to the relative lateral distance and the speed of the vulnerable traffic participant.

The warning distance calculation unit 12 obtains a relative speed between the host vehicle relative and the vulnerable traffic participant, and calculates a warning distance according to the warning scenario and the relative speed.

The collision warning unit 13 obtains the relative distance between the host vehicle and the vulnerable traffic participant, and determines whether a corresponding level of collision warning should be issued according to a comparison result between the warning distance and the relative distance.

Specifically, the collision warning system further includes a risk determination unit. The risk determination unit periodically determines whether there is a collision risk between the host vehicle and vulnerable traffic participant. If there is no collision risk, no processing is performed by the risk determination unit. If there is a collision risk, the risk determination unit generates a warning calculation signal and sends the warning calculation signal to the warning module 1. When receiving the warning calculation signal, the warning module 1 obtains the relative lateral distance between the host vehicle and the vulnerable traffic participant and obtains the speed of the vulnerable traffic participant by the warning scenario determination unit 11, and determines the warning scenario according to the relative lateral distance and the speed of the vulnerable traffic participant; the warning distance calculation unit 12 is used to obtain the relative speed of the host vehicle relative to the vulnerable traffic participant, and calculates the warning distance according to the warning scenario and the relative speed; uses the collision warning unit 13 to obtain the relative distance between the host vehicle and the vulnerable traffic participant, and determines whether to issue a corresponding level of collision warning according to the comparison result between the calculated warning distance and the relative distance.

In one embodiment, the collision warning system further comprises a storage device 2 and at least one processor 3. The collision warning system is applied in an electronic device. For example, the electronic device includes an in-vehicle device. The storage device 2 is connected to the warning scenario determination unit 11, the warning distance calculation unit 12, and the collision warning unit 13. In one embodiment, the storage device 2 stores the computerized instructions of the collision warning system. The storage device 2 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The at least one processor 3 is used to execute the collision warning system and other applications, such as an operating system, installed in the electronic device. In one embodiment, the processor 3 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The processor 3 can be a microprocessor or any conventional processor.

In one embodiment, the word "module" or "unit" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function modules described herein may be implemented as either software and/or hardware modules and may be stored in a storage device.

The embodiments of the collision warning system described above are only illustrative, and the units described as separate components may or may not be physically separated, and the components shown as units may or may not be physical units, that is, they may be located in one element, or it can be distributed to multiple network elements. Part or all of the modules can be selected according to actual needs to achieve the purpose of the solution of the embodiment.

It should be noted that the collision warning system described in the above embodiment corresponds to the collision warning method described in the above embodiment. Therefore, the unspecified parts of the collision warning system described in the above embodiment can be obtained by referring to the content of the collision warning method described in the above embodiment, that is, the specific steps recorded in the collision warning method of the above embodiment can be understood as the functions that can be realized by the collision warning system of this embodiment, and will not be repeated here.

In one embodiment, if the collision warning system for protecting vulnerable traffic participants in the above embodiments is realized in the form of a software function and sold or used as an independent product, it can be stored in a computer-readable storage medium, such as a non-transitory storage medium.

In one embodiment, the present disclosure provides a computer-readable storage medium, on which computer program is stored. When the computer program is executed by the processor 3, the steps of the collision warning method for protecting vulnerable traffic participant described in the above-mentioned embodiments are implemented.

In one embodiment, the computer-readable storage medium may include any entity or device capable of carrying the computer program instructions, a recording medium, a USB flash drive, a removable hard disk, a magnetic disk, an optical disk, a computer memory, a read-only memory (ROM), a random access memory (RAM), an electric carrier signal, a telecommunication signal and a software distribution medium, etc.

Those skilled in the art should understand that the above description and the embodiments of the present disclosure shown in the drawings are only examples and do not limit the present disclosure. The function and structure and principles of the present disclosure have been shown and explained in the embodiments. Without departing from the principles, the implementation of the present disclosure may have any deviation or modification.

What is claimed is:

1. A collision warning method for protecting vulnerable traffic participant comprising:

obtaining a relative lateral distance between a host vehicle and a vulnerable traffic participant and obtaining a speed of the vulnerable traffic participant, and determining whether a warning scenario has reached according to the relative lateral distance and the speed of the vulnerable traffic participant;

obtaining a relative speed between the host vehicle relative and the vulnerable traffic participant, and calculating a warning distance according to the warning scenario and the relative speed;

obtaining a relative distance between the host vehicle and the vulnerable traffic participant, and determining whether to issue a collision warning, wherein the collision warning corresponds to a comparison result between the warning distance and the relative distance.

2. The collision warning method as recited in claim 1, wherein determining whether the warning scenario has reached according to the relative lateral distance and the speed of the vulnerable traffic participant comprises:

when the relative lateral distance is within a preset first distance range and the speed of the vulnerable traffic participant is greater than a preset first speed threshold, determining the warning scenario has reached a first warning scenario;

when the relative lateral distance is within a preset second distance range, or the speed of the vulnerable traffic participant is less than or equal to the preset first speed threshold, determining the warning scenario has reached a second warning scenario.

3. The collision warning method as recited in claim 2, wherein calculating the warning distance according to the warning scenario and the relative speed comprises:

in the first warning scenario, calculating a first warning distance when the host vehicle is in a decelerating state, wherein the first warning distance is a sum of a distance that the host vehicle moves during a time period from the host vehicle starts to brake to the host vehicle stops, and a preset safety distance;

wherein determining whether to issue the collision warning corresponding to the comparison result between the warning distance and the relative distance comprises:

in the first warning scenario, issuing the collision warning comprising a first-level warning when the relative distance is less than or equal to the first warning distance;

issuing no collision warning when the relative distance is greater than the first warning distance.

4. The collision warning method as recited in claim 2, wherein calculating the warning distance according to the warning scenario and the relative speed comprises:

in the first warning scenario, calculating a second warning distance when the host vehicle is in a non-decelerating state, wherein the second warning distance is a sum of a product of a distance that the host vehicle moves during a time period from the driver has a brake reaction to a braking of the host vehicle takes effect and a preset warning distance calculation coefficient, and a first warning distance;

wherein determining whether to issue the collision warning corresponding to the comparison result between the warning distance and the relative distance comprises:

in the first warning scenario, issuing the collision warning comprising a first-level warning when the relative distance is less than or equal to the second warning distance;

issuing no collision warning when the relative distance is greater than the second warning distance.

5. The collision warning method as recited in claim 2, wherein calculating the warning distance according to the warning scenario and the relative speed comprises:
   in a second warning scenario, calculating a third warning distance when the host vehicle is in a decelerating state, wherein the third warning distance is a sum of a distance that the host vehicle moves during a time period form the host vehicle starts to brake to the host vehicle stops, and a preset safety distance;
   wherein determining whether to issue the collision warning corresponding to the comparison result between the warning distance and the relative distance comprises:
   in the second warning scenario, issuing the collision warning comprising a second-level warning when the relative distance is less than or equal to the third warning distance;
   issuing no collision warning when the relative distance is greater than the third warning distance.

6. The collision warning method as recited in claim 2, wherein calculating the warning distance according to the warning scenario and the relative speed comprises:
   in the second warning scenario, calculating a fourth warning distance when the host vehicle is in a non-decelerating state, wherein the fourth warning distance is a sum of a product of a distance that the host vehicle moves during a time period from a brake system of the host vehicle is activated to the host vehicle stops and a preset warning distance calculation coefficient, and a third warning distance;
   wherein determining whether to issue the collision warning corresponding to the comparison result between the warning distance and the relative distance comprises:
   in the second warning scenario, issuing no collision warning when the relative distance is greater than the fourth warning distance;
   calculating a fifth pre-warning distance when the relative distance is less than or equal to the fourth pre-warning distance;
   issuing the collision warning comprising a first-level warning when the relative distance is greater than the fifth warning distance, wherein the fifth warning distance is a sum of a distance that the host vehicle moves during a time period from a brake system of the host vehicle is activated to the host vehicle stops, and the third warning distance.

7. The collision warning method as recited in claim 6, wherein calculating the warning distance according to the warning scenario and the relative speed comprises:
   in the second warning scenario, calculating a sixth warning distance when the relative distance is less than or equal to the fifth warning distance, wherein the sixth warning distance is a sum of a distance that the host vehicle movies during a time period from the brake system of the host vehicle is activated to the host vehicle is braked, and the third warning distance;
   wherein determining whether to issue the collision warning corresponding to the comparison result between the warning distance and the relative distance comprises:
   issuing the collision warning comprising a second-level warning when the relative distance is greater than the sixth warning distance;
   issuing the collision warning comprising a third-level warning when the relative distance is less than or equal to the sixth early-warning distance.

8. The collision warning method as recited in claim 1, before determining whether a warning scenario has reached according to a relative lateral distance and a speed of the vulnerable traffic participant, the collision warning method further comprising:
   periodically determining whether a collision risk is present between the host vehicle and the vulnerable traffic participant;
   when the collision risk is determined to be present, obtaining the relative lateral distance between a host vehicle and a vulnerable traffic participant and obtaining the speed of the vulnerable traffic participant, and determining whether a warning scenario has reached according to the relative lateral distance and the speed of the vulnerable traffic participant.

9. The collision warning method as recited in claim 8, wherein periodically determining whether a collision risk is present between the host vehicle and the vulnerable traffic participant comprises:
   obtaining a direction angle of a position of the vulnerable traffic participant relative to a heading angle of the host vehicle, and determining a position classification of the vulnerable traffic participant according to a comparison result between the direction angle and a preset angle range, wherein the position classification comprises a first classification indicating that the vulnerable traffic participant is located in front of the host vehicle, and a second classification indicating that the vulnerable traffic participant is located at the rear of the host vehicle;
   obtaining information of a current gear of the host vehicle, and determining whether the host vehicle is moving forward or reversing according to the information of the current gear of the host vehicle;
   determining whether the collision risk is present according to the information of the current gear of the host vehicle and the position classification,
   wherein when the host vehicle is moving forward and the position classification of the vulnerable traffic participant is the second classification, determining that the collision risk is not present; and when the host vehicle is reversing and the position classification of the vulnerable traffic participant is the first classification, determining that the collision risk is not present.

10. The collision warning method as recited in claim 9, wherein periodically determining whether a collision risk is present between the host vehicle and the vulnerable traffic participant comprises:
    obtaining a current speed of the host vehicle;
    when the current speed of the host vehicle is less than a preset second speed threshold, obtaining information of a last recorded host vehicle heading angle and information of a current wheel angle of the host vehicle, and adding the last recorded heading angle of the host vehicle to the current wheel angle of the host vehicle to obtain the current heading angle of host vehicle.

11. The collision warning method as recited in claim 9, wherein periodically determining whether a collision risk is present between the host vehicle and the vulnerable traffic participant comprises:
    obtaining a relative distance between the host vehicle and the vulnerable traffic participant, and comparing the relative distance with a preset distance threshold;
    determining that the collision risk is not present when the relative distance is greater than the preset distance threshold.

12. The collision warning method as recited in claim 9, wherein periodically determining whether a collision risk is present between the host vehicle and the vulnerable traffic participant comprises:

obtaining a current speed of the host vehicle, and comparing the current speed of the host vehicle with a preset second speed threshold, determining that the collision risk is not present when the current speed of the host vehicle is less than or equal to the second speed threshold.

13. The collision warning method as recited in claim 9, wherein periodically determining whether a collision risk is present between the host vehicle and the vulnerable traffic participant comprises:
obtaining the relative lateral distance between the vulnerable traffic participant and the host vehicle;
when the relative lateral distance is within the preset second distance range and the speed of the vulnerable traffic participant is less than or equal to a preset first speed threshold, determining that the collision risk is not present.

14. A collision warning system for protecting vulnerable traffic participant comprising:
a processor; and
a non-transitory storage medium coupled to the processor and configured to store a plurality of instructions, which cause the processor to:
obtain a relative lateral distance between a host vehicle and a vulnerable traffic participant and obtain a speed of the vulnerable traffic participant, and determine whether a warning scenario has reached according to the relative lateral distance and the speed of the vulnerable traffic participant;
obtain a relative speed between the host vehicle relative and the vulnerable traffic participant, and calculate a warning distance according to the warning scenario and the relative speed;
obtain a relative distance between the host vehicle and the vulnerable traffic participant, and determine whether to issue a collision warning, wherein the collision warning corresponds to a comparison result between the warning distance and the relative distance.

15. The collision warning system as recited in claim 14, wherein the plurality of instructions are further configured to cause the processor to:
periodically determine whether a collision risk is present between the host vehicle and the vulnerable traffic participant;
generate a warning calculation signal when the collision risk is determined;
obtain the relative lateral distance between the host vehicle and the vulnerable traffic participant and obtain the speed of the vulnerable traffic participant in response to the warning calculation signal;
determine the warning scenario according to the relative lateral distance and the speed of the vulnerable traffic participant;
obtain a relative speed of the host vehicle relative to the vulnerable traffic participant, and calculate a warning distance according to the warning scenario and the relative speed;
obtaining a relative distance between the host vehicle and the vulnerable traffic participant, and determine whether to issue a collision warning according to a comparison result between the warning distance and the relative distance.

16. A non-transitory storage medium having stored thereon instructions that, when executed by at least one processor, causes the least one processor to execute instructions of a collision warning method for protecting vulnerable traffic participant, the instructions comprising:
obtaining a relative lateral distance between a host vehicle and a vulnerable traffic participant and obtaining a speed of the vulnerable traffic participant, and determining whether a warning scenario has reached according to the relative lateral distance and the speed of the vulnerable traffic participant;
obtaining a relative speed between the host vehicle relative and the vulnerable traffic participant, and calculating a warning distance according to the warning scenario and the relative speed;
obtaining a relative distance between the host vehicle and the vulnerable traffic participant, and determining whether to issue a collision warning, wherein the collision warning corresponds to a comparison result between the warning distance and the relative distance.

17. The non-transitory storage medium as recited in claim 16, wherein the instructions further comprising:
when the relative lateral distance is within a preset first distance range and the speed of the vulnerable traffic participant is greater than a preset first speed threshold, determining the warning scenario as a first warning scenario;
when the relative lateral distance is within a preset second distance range, or the speed of the vulnerable traffic participant is less than or equal to the preset first speed threshold, determining the warning scenario has reached a second warning scenario.

18. The non-transitory storage medium as recited in claim 17, wherein the instructions further comprising:
calculating the warning distance according to the warning scenario and the relative speed comprises:
in the first warning scenario, calculating a first warning distance when the host vehicle is in a decelerating state, wherein the first warning distance is a sum of a distance that the host vehicle during a time period from the host vehicle starts to brake to the host vehicle stops and a preset safety distance;
wherein determining whether to issue the collision warning corresponding to the comparison result between the warning distance and the relative distance comprises:
in the first warning scenario, issuing the collision warning comprising a first-level warning when the relative distance is less than or equal to the first warning distance;
issuing no collision warning when the relative distance is greater than the first warning distance.

19. The non-transitory storage medium as recited in claim 17, wherein the instructions further comprising:
calculating the warning distance according to the warning scenario and the relative speed comprises:
in the first warning scenario, calculating a second warning distance when the host vehicle is in a non-decelerating state, wherein the second warning distance is a sum of a product of a distance that the host vehicle moves during a time period from the driver has a brake reaction to a braking of the host vehicle takes effect and a preset warning distance calculation coefficient, and a first warning distance;
wherein determining whether to issue the collision warning corresponding to the comparison result between the warning distance and the relative distance comprises:
in the first warning scenario, issuing the collision warning comprising a first-level warning when the relative distance is less than or equal to the second warning distance;

issuing no collision warning when the relative distance is greater than the second warning distance.

20. The non-transitory storage medium as recited in claim 17, wherein the instructions further comprising:
calculating the warning distance according to the warning scenario and the relative speed comprises:
in a second warning scenario, calculating a third warning distance when the host vehicle is in a decelerating state, wherein the third warning distance is a sum of a distance that the host vehicle moves during a time period from the host vehicle starts to brake to the host vehicle stops and a preset safety distance;
wherein determining whether to issue the collision warning corresponding to the comparison result between the warning distance and the relative distance comprises:
in the second warning scenario, issuing the collision warning comprising a second-level warning when the relative distance is less than or equal to the third warning distance;
performing no collision warning when the relative distance is greater than the third warning distance.

* * * * *